United States Patent [19]

Jacobson

[11] Patent Number: 5,406,078

[45] Date of Patent: Apr. 11, 1995

[54] INDUCED GAMMA RAY SPECTORSCOPY WELL LOGGING SYSTEM

[75] Inventor: Larry A. Jacobson, Richmond, Tex.

[73] Assignee: Halliburton Logging Services, Inc., Houston, Tex.

[21] Appl. No.: 218,682

[22] Filed: Mar. 28, 1994

Related U.S. Application Data

[63] Continuation of Ser. No. 890,416, May 28, 1992, abandoned.

[51] Int. Cl.$^6$ .............................................. G01V 5/10
[52] U.S. Cl. .............................. 250/261; 250/269.6; 250/269.8
[58] Field of Search ................. 250/261, 270, 269.6, 250/269.8

[56] References Cited

U.S. PATENT DOCUMENTS

| | | | |
|---|---|---|---|
| 3,213,279 | 10/1965 | Caldwell | 250/252.1 |
| 3,752,984 | 8/1973 | Scott et al. | 376/161 |
| 3,767,921 | 10/1973 | Jones | 250/261 |
| 3,780,301 | 12/1973 | Smith, Jr. et al. | 250/301 |
| 3,780,303 | 12/1973 | Smith, Jr. et al. | 250/301 |
| 3,842,264 | 10/1974 | Arnold et al. | 250/264 |
| 4,020,342 | 4/1977 | Smith, Jr. et al. | 250/270 |
| 4,071,757 | 1/1978 | Arnold et al. | 376/166 |
| 4,424,444 | 1/1984 | Smith, Jr. et al. | 250/270 |
| 4,596,927 | 6/1986 | Hopkinson et al. | 250/270 |
| 4,760,252 | 7/1988 | Albats et al. | 250/390.07 |
| 4,766,543 | 8/1988 | Schmidt | 364/422 |
| 4,972,082 | 11/1990 | Loomis et al. | 250/269 |
| 5,021,653 | 6/1991 | Roscoe et al. | 250/270 |

FOREIGN PATENT DOCUMENTS

0416970A3 3/1991 European Pat. Off. .

OTHER PUBLICATIONS

"Chlorine Logging in Cased Holes", by J. T. Dewan, O. L. Stone, and R. L. Morris, Jun. 1961, pp. 531–537.
"Gamma Radiation from Inelastic Scattering of 14–Mev Neutrons by the Common Earth Elements", by Richard L. Caldwell, William R. Mills, Jr., and John B. Hickman, Jr., Feb. 15, 1960, Nuclear Science and Engineering: 8, 173–182.
"A New Nuclear Log for the Determination of Reservoir Salinity", by Stanley G. Stroud and Herman E. Schaller, Feb. 1960, Journal of Petroleum Technology, Feature Article SPE 10500, pp. 37–41.
"Carbon–Oxygen (C/O) Log: Use and Iterpretation", by Lock and Hoyer, Society of Petroleum Engineers, SPE 4639, 1973.
"Laboratory and Field Evaluation of a Carbon/Oxygen Well logging System", by Ward E. Schultz and Harry D. Smith, Jr., Society of Petroleum Engineers, SPE 4638, 1973.
"Carbon Oxygen (C/O) Logging Instrumentation", by R. B. Culver, E. C. Hopkinson, and A. H. Youmans, Society of Petroleum Engineers, SPE 4640, 1973.
"The Multiparameter Spectroscopy Instrument Continuous Carbon/Oxygen Log–MSI C/O", by D. M. Chace, M. G. Schmidt, and M. P. Ducheck, pp. 1–14.
"Geochemical Logging With Spectrometry Tools", by R. Hertzog, L. Colson B. Seeman, M. O'Brien, H. Scott, D. McKeon, P. Wraight, J. Grau, D. Ellis, J. Schweitzer, and M. Herron, Society of Petroleum Engineers, SPE 16792, 1987.

(List continued on next page.)

Primary Examiner—Constantine Hannaher
Attorney, Agent, or Firm—Arnold, White & Durkee

[57] ABSTRACT

A system for measuring fast neutron induced gamma ray energy spectra in cased wellbores. The system includes an electronic source of monoenergetic 14 MeV fast neutrons, a high density bismuth germanate scintillation detector, a downhole pulse height analyzer and a highly accurate gain stabilizer circuit. The gain stabilization utilizes the iron (Fe) edge in the catpure gamma ray spectrum to establish system gain since iron is always present in the tool case and the wellbore casing.

11 Claims, 3 Drawing Sheets

OTHER PUBLICATIONS

"A New Through-Tubing Oil-Saturation Measurement System", by B. A. Rosoon, C. Stoller, R. A. Adalph, Y. Boutemy, J. C. Cheeseborough, III, J. D. Hall, D. O. McKeon, D. Pittman, B. Seeman, and S. R. Thomas, Jr., Society of Petroleum Engineers, SPE 21412; 1981.

"A New Compensated Through-Tubing Carbon/Oxygen Tool For Use in Flowing Wells", H. D. Scott, C. Stoller, B. A. Roscoe, R. E. Plasek, and R. A. Adolph, SPWLA 32nd Annual Logging Symposium, Jun. 16-19, 1991.

"Detector Design and Data Processing Effects on Elemental Yield Variance", by M. L. Gartner and L. A. Jacobson.

"The Dependence of Elemental Yield Variance on Detector Type Through Mathematical Modeling", by M. L. Gartner and L. A. Jacobson, pp. 1-5.

"Advance in Cased Hole Loggin-The Multiparameter Spectroscopy Instrument Continuous Carbon/Oxygen Log (MSI C/O)", by Chace, D. M. Schmidt, M. G., Frost, E., Fertl, W. H., 3rd International Conference on Heavy Crude & Tar Sands, Jul. 22-31, 1985, Long Beach, Calif.

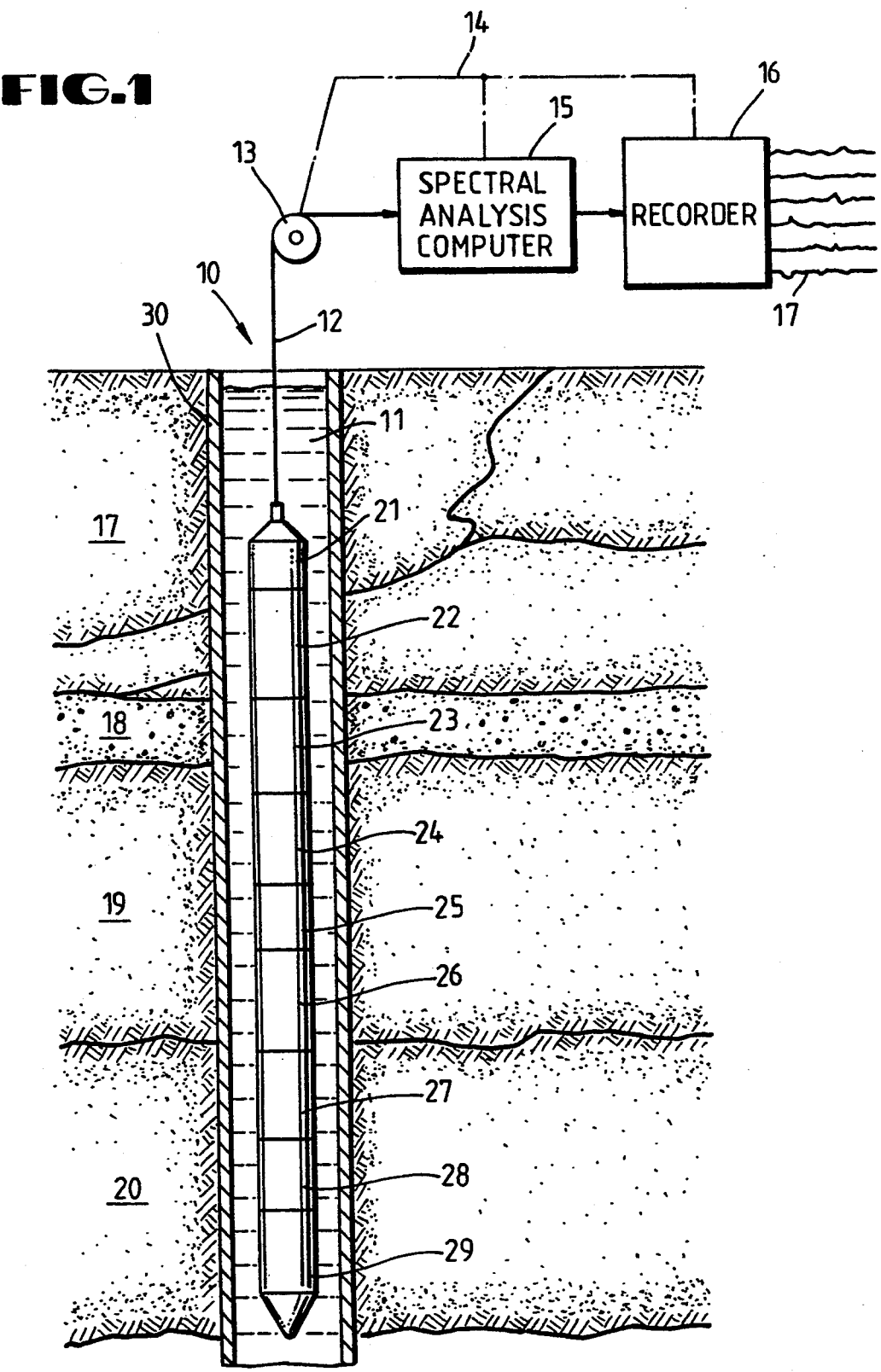

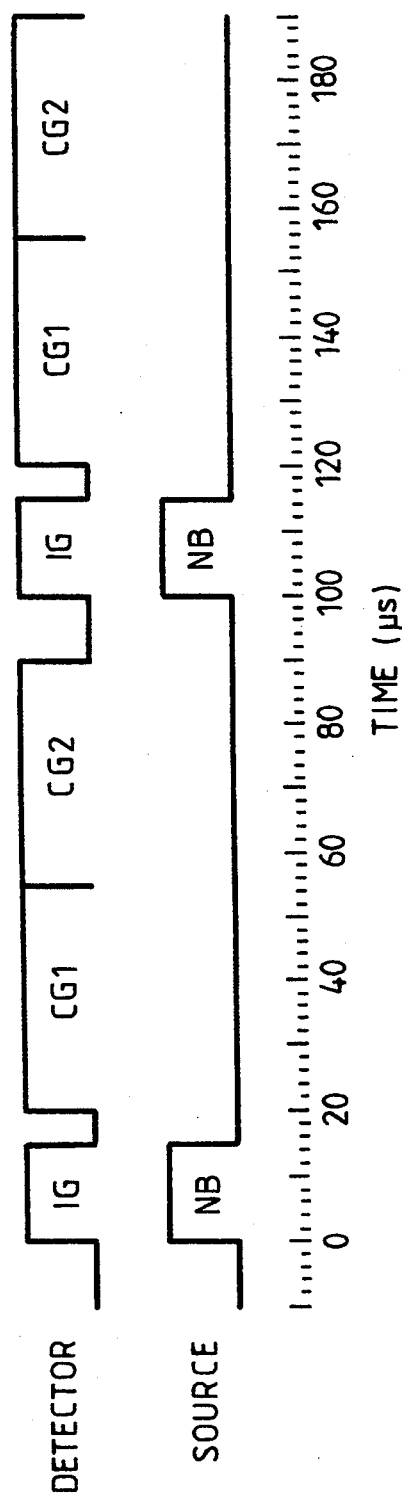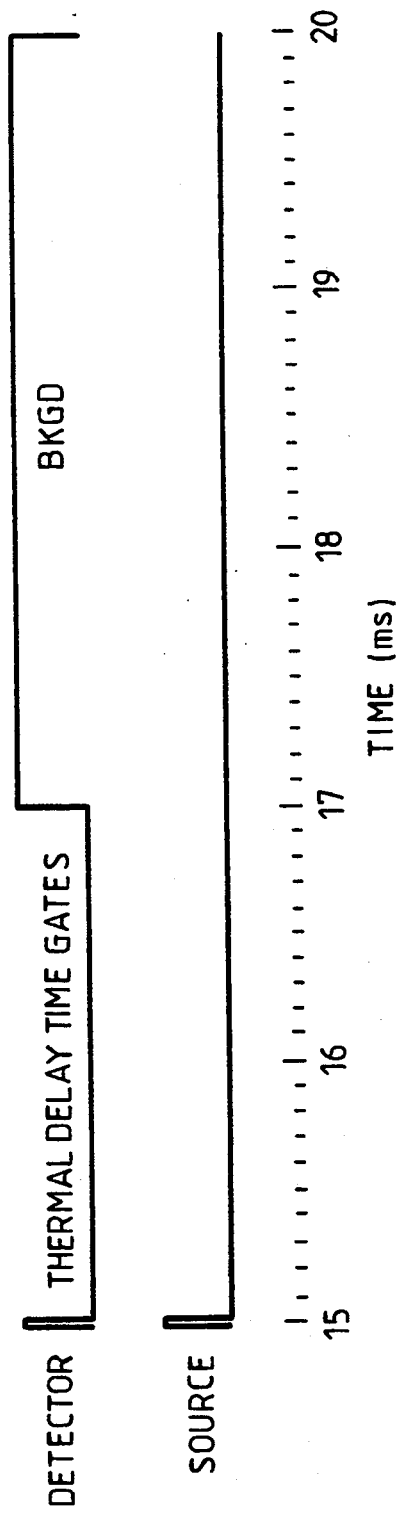

INDUCED GAMMA RAY SPECTORSCOPY WELL LOGGING SYSTEM

This application is a continuation of application Ser. No. 07/890,416, filed May 28, 1992, now abandoned.

BACKGROUND OF THE INVENTION

Proposals to use induced gamma ray spectroscopy for detecting carbon/oxygen ratio in a well borehole dates back several decades. Commercial operations in this field have dated from the mid-1970's. The primary applications today remain the cased hole determination of oil saturation in reservoirs of low or unknown water salinity. Well boreholes are usually "cased" soon after drilling by inserting tubular steel casing, the inside diameter of which is usually filled with oil or water or gas or a combination thereof. Void space between the outside of the casing and the earth formation penetrated by the borehole is filled with a sheath of cement. Recent efforts have expanded the use of the technique to geochemical analysis in open hole. Unfortunately, the intrinsic dynamic range of the carbon/oxygen ratio measurement is small. This requires very high statistical precision for reasonable oil saturation uncertainty. Until recently, the technique has been very slow and often required stationary measurements. This was in part because of the small intrinsic dynamic range of the carbon oxygen ratio, but, also because the detectors used in well logging instruments had significant limitations.

A gamma ray scintillation type detector consists of a scintillation crystal optically coupled to a photomultiplier tube. Intensity of light induced within the crystal by an impinging gamma ray is proportional to the energy of the gamma ray. The optically coupled photomultiplier tube generates an electrical pulse which is proportional to the intensity of the light generated within the scintillation crystal. It follows, therefore, that the electrical pulse generated by the photomultiplier tube is proportional to the energy of the gamma ray impinging upon the scintillation crystal.

Over the past decade or so, several new high density scintillators in gamma ray spectrometer detectors have become available which can provide improved gamma ray detection capability. Newer carbon/oxygen and geochemical logging tools can use these new high density scintillators. One of these materials is bismuth germanate (BGO). The merit of this higher density scintillator relative to less dense conventional sodium iodide scintillator (previously used in induced gamma ray spectrometers) is that it provides substantially better detection efficiency. That is, a larger fraction of the total gamma ray flux is in the full energy or first escape peak. Less gamma ray energy is disposed in the structureless Compton scattered low energy tail, in the more dense bismuth germanate detectors relative to sodium iodide. Additionally, in a well logging system according to concepts of the present invention, a different and unique gain stabilization system is employed which further insures more accurate energy representation of the detected gamma rays by more precisely controlling the system gain.

BRIEF DESCRIPTION OF THE INVENTION

The induced gamma ray spectrometry tool of the present invention uses a monoenergetic 14 MeV source to irradiate earth formations in the vicinity of the borehole with 14 MeV neutrons. Time gates are provided to detect both capture gamma ray spectra and an inelastic scattering gamma ray spectrum. A bismuth germanate (BGO) detector is used in the system of the present invention. Output pulses from the photomultiplier tube which is optically coupled to the BGO detector are supplied to a pulse height analyzer, having 256 channel of energy resolution. A portion of the measured capture gamma ray spectrum itself, employing the iron edge, is used to gain stabilize pulse height analyzer circuitry thereby making it extremely stable.

The downhole measured pulse height spectra are accumulated in a downhole memory which is part of the pulse height analyzer and are telemetered to the surface via a digital telemetry system at regular intervals. A surface computer then is programmed to analyze the spectra and to record various quantities of interest, such as the carbon/oxygen ratio; the silicon to calcium ratio; and other parameters of interest in neutron induced gamma ray spectroscopy logging.

The above referred to and other cited features of the present invention are better understood by reference to the detailed description to follow when taken in conjunction with the accompanying drawings in which:

BRIEF DESCRIPTION OF THE DRAWINGS

FIG. 1 is a schematic diagram illustrating a well logging system in accordance with concepts of the present invention disposed in a well borehole;

FIG. 2A is a timing diagram showing the timing of a short spaced burst subsequence for both the neutron source and detector when used in accordance with concepts of the present invention;

FIG. 2B is a timing diagram showing the timing subsequence for a slow or long spaced neutron burst subsequence for both the neutron source and the detector when used in accordance with concepts of the present invention;

DETAILED DESCRIPTION OF THE INVENTION

Figure 3:
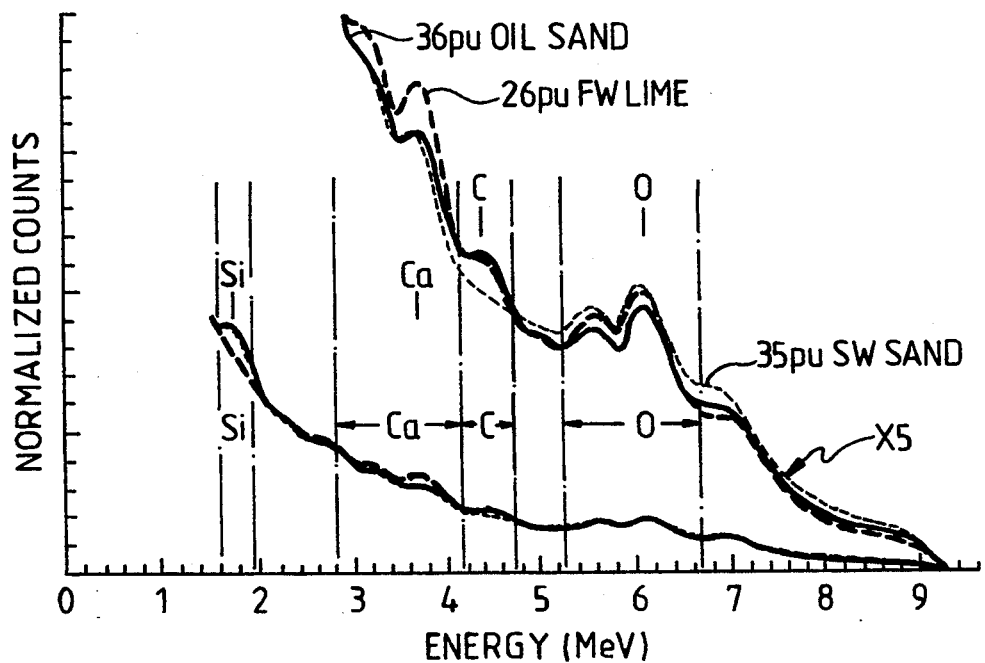
FIG. 3 is a diagram illustrating an inelastic gamma ray spectrum taken with an instrument according to the concepts of the present invention.

Referring initially to FIG. 1, a well logging system in accordance with concepts of the present invention is illustrated in a very highly schematic manner in a cased well borehole. A well borehole 10 lined with a steel casing 30 and filled with a borehole fluid 11 penetrates earth formations 17, 18, 19 and 20. A well logging cable 12, which is of the usual armored multiconductor cable type, supports in the borehole 10, a well logging sonde 21 for making neutron induced gamma ray spectral measurements in accordance with the concepts of the present invention. The well logging cable 12 passes over a sheave wheel 13 which maybe electrically or mechanically coupled, as indicated by a dotted line 14, to a spectral analysis computer 15 and a data recorder 16. The spectral analysis computer 15 may comprise, for example, any suitably programmed general purpose computer capable of receiving signals from the downhole equipment. The recorder 16 may comprise a strip chart recorder, as indicated having a record medium 17, or may comprise a digital tape or a disk file memory as desired.

The downhole sonde 21 comprises a power supply portion 22, a timing circuit portion 23, a telemetry portion 24, a gain stabilizer portion 25, a pulse height analyzer portion 26, a detector portion 27, a source portion 28, and a high voltage power supply portion 29. In operation, the power supply portion 22 takes electrical power from one or more of the conductors of logging cable 12 and converts it to appropriate voltage and current levels for supplying internal circuits of the downhole sonde 21 with electrical power as required. The timing circuits, as will be discussed in more detail subsequently in conjunction, with FIG. 2, provide timing pulses for opening and closing various data gates and thereby operating various detection schemes according to the concepts of the invention. The telemetry circuitry 24 is a conventional digital telemetry system capable of communicating to and from the surface supplied equipment at a rate of 50 kilobits/sec.

The gain stabilizer circuit 25, which will be described in more detail subsequently, operates in conjunction with the pulse height analyzer 26. The analyzer 26 receives signals from the detector portion of the tool 27. The detector signals are representative of gamma rays impinging upon the detector and which have been induced by a neutron bombardment from a neutron source 28 which is supplied for its operation by approximately 100 kilovolt high voltage power supply 29 or from a background gamma ray source.

FIG. 2, comprising a fast timing subcycle shown as FIG. 2a and a slower timing subcycle shown as FIG. 2b, illustrates the timing applied to both the neutron source 28 and the detector circuits 26,27 in the present invention. Referring initially to FIG. 2b, a timing cycle of 5 milliseconds in duration and repeated 50 times/sec. is illustrated. The neutron source 28 is turned on for a very short 14 MeV neutron pulse having a time duration of approximately 15 microseconds at the beginning of this 5 millisecond duration sub-cycle.

During the 1985 microseconds after the neutron source is turned off, a plurality of time gates are opened to measure the thermal neutron population die-away as a function of time. Up to six, eight or even more gates maybe used as desired according to known techniques such as that of U.S. Pat. No. 4,424,444. Using this technique the borehole and formation thermal neutron capture cross-sections are measured. Thus the die-away of thermal neutrons produced by the moderation of the fast neutrons emitted by the neutron source 28 are detected for the first two milliseconds of this 5 millisecond subcycle. For the remaining 3 milliseconds of the subcycle portion of FIG. 2b, then, the detector 27 is used to detect background gamma radiation due to naturally occurring gamma rays in the earth formations surrounding the well bore. All measurements may thus be corrected for background based on this background measurement by subtraction of the appropriately scaled count rate. Inelastic scatter measurements can also be corrected for capture gamma radiation by extrapolating measured capture gamma radiation intensity back to the time of the neutron burst using the measured die away constant.

During the fast pulse portion of the timing diagram illustrated in FIG. 2a, it may be observed that the neutron source is pulsed on for fifteen microsecond duration pulses (indicated as NB in the timing diagram). In FIG. 2a, while the neutron bursts starting at time T=zero and T=100 microseconds are taking place an inelastic scattering gamma ray time gate is opened allowing pulses from the detector 27 occurring during the neutron burst to be gated to the pulse height analyzer circuitry 26. At the close of the neutron burst, the detector 27 is gated off for approximately 5 microseconds. This allow thermalization of the fast neutrons. Then a first capture gamma ray time gate having a duration of thirty-five from 20 to 55 microseconds) is opened. A second capture gamma ray time gate having a duration of thirty-five microseconds (from 55 to 90 microseconds) is opened thereafter. These gates are labelled respectively CG1 and CG2 in FIG. 2a. The entire short or fast pulse cycle is then repeated beginning at the time labelled 100 microseconds of FIG. 2a and the neutron source and detector timing are repeated as previously described for the next 100 microseconds. The entire sequence which is illustrated in FIG. 2a is repeated for a period of 1500 microseconds. The short or fast pulse subintervals of 100 microseconds duration are time interlocked with the longer 5 millisecond intervals illustrated in FIG. 2B. Timing pulses suitable for this purpose are produced in Timing Circuit section 23 of FIG. 1.

Referring now to FIG. 3, an inelastic gamma ray energy spectrum which comprises gamma ray pulses detected during the gates labelled IG (inelastic gamma rays) in FIG. 2a and supplied to the pulse height analyzer 26 during this time when the neutron bursts are on is shown schematically. It will be observed that in the inelastic gamma ray spectrum that inelastic scattering peaks attributable to carbon, oxygen, silicon and calcium appear in the inelastic gamma ray spectrum. The inelastic spectrum of course is caused by a fast neutron scattering from the nucleus of an element in the vicinity of the borehole and exciting these nuclei to higher energy levels thereby losing some of the energy of the scattered neutrons (ie. scattering with energy loss). The excited nuclei returning to the ground state emit gamma rays characteristic of each of the nuclear species. Energy windows labelled C, O, Ca, Si are shown in the spectrum of FIG. 3 for the carbon, oxygen, silicon and calcium inelastic scattering energy peaks.

Figure 4:
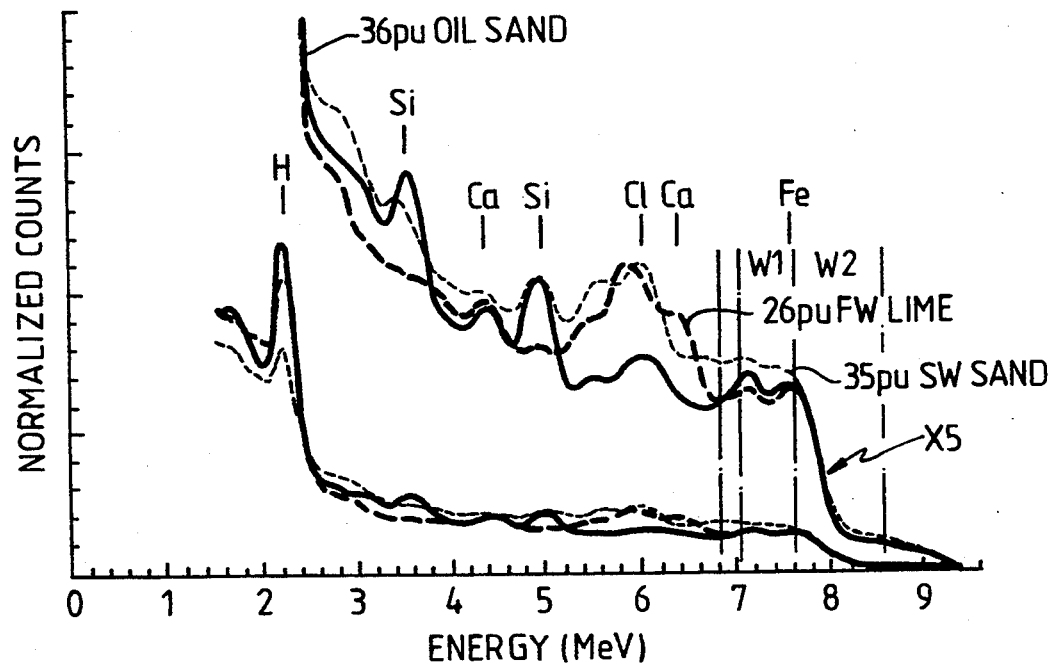
FIG. 4 is a schematic diagram illustrating a capture gamma ray spectrum taken according to the concepts of the present invention and showing gain stabilization of energy windows.

Referring now to FIG. 4, a capture gamma ray spectrum is shown schematically. The capture gamma ray spectrum is taken in gates labelled CG1 and CG2 in FIG. 2a. This spectrum is attributable to the emission of gamma rays by the decay to the ground state of nuclei which have been excited by the capture of thermalized neutrons. As it takes perhaps several microseconds for all of the neutrons to become thermalized following the emission of a fast neutron burst from the source 28 of the instrument 21 shown in FIG. 1, the waiting period of 5 microseconds between the end of the neutron burst to the beginning of the capture gamma ray gates illustrated in FIG. 2a allows for thermalization of the fast 14 MeV neutrons emitted by the source 28 to achieve a thermal neutron population.

Referring again to FIG. 4, it will be seen that the iron peak (labelled Fe in FIG. 4) occurs at an energy of 7.65 MeV. Energy windows labelled W1 and W2 are positioned to straddle the Fe peak and are used for system gain control purposes. The iron peak will of course always be present in a cased well borehole in which the pulsed spectral gamma ray tool according to the concepts of the present invention is deployed.

The iron edge is always a prominent feature in cased well borehole spectrum, because the casing and the tool housing both contain iron. The iron peak is located at 7.65 MeV and is discernable, but not very prominent, in the capture gamma ray spectrum of FIG. 4. This peak becomes less prominent if chlorine infested or salt water is present in the earth formations surrounding the borehole. However, all of the capture gamma ray spectra show a precipitous drop at energies just above the iron 7.65 MeV line. Thus, two equal width adjacent windows labelled W1 and W2 spanning this edge are indicated in FIG. 4. Equality of width of these energy windows is not a critical requirement but is only made for convenience.

A spectral procedure for gain stabilization is based upon the count rates in the energy windows labelled W1 and W2. This procedure which is implemented in a microprocessor program in gain stabilizer 25 adjusts the photomultiplier high voltage (contained in detector 27) to maintain the ratio of counts in the energy window labelled W1 to that in energy window labelled W2 equal to the integer two. Again, this value of 2.0 is not particularly necessary as any value in the range from two to three would probably work just as well. It is merely convenient to use. Thus, the gain of the photomultiplier portion of detector 27 is increased whenever the ratio becomes greater than 2.0 and the gain of the photomultiplier is decreased whenever the ratio becomes less than 2.0. This places the juncture of the two windows near the upper count rate portion of the iron (Fe) edge. Because there are two gain settings where the window ratio will be 2, a start up procedure is required to assume selection of the correct gain value. This is accomplished by raising the photomultiplier gain until the count rate in the upper window W2 exceeds a predetermined minimum value prior to beginning the gain stabilization process as previously described.

Laboratory and field experience have demonstrated the utility and reliability of this technique of gain stabilization. Important and innovative features of this gain stabilization are that no isotopic source is required which would contribute a background to the primary measurement. Also, the stabilization is made on a feature of a capture gamma ray spectrum which is always present and which is unperturbed by formation matrix composition or borehole or formation fluid composition. Finally, stabilization of the pulse height analyzer spectral gain on a high energy feature of the spectrum renders the spectrum much less sensitive to zero offset.

It should also be noted that while the preferred embodiment previously described varies the high voltage on the photomultiplier tube itself inorder to effect gain stabilization, that this stabilization technique could equally well be applied to a variable gain amplifier which would come subsequent to the photomultiplier tube in the electronic circuitry comprising the detector 27 portion of the sonde 21 of FIG. 1.

The foregoing descriptions may make other alternative embodiments of the invention apparent to those having skill in the art. It is the aim of the appended claims to cover all such changes and modifications as fall within the true spirit and scope of the invention.

I claim:

1. A system for use in cased well boreholes for measuring gamma ray spectra induced by the bombardment of earth formations in the vicinity of the well borehole with fast neutrons, comprising:
   (a) an electronic source of monoenergetic fast neutrons which are emitted in pulses and which penetrate the borehole fluid, the casing and its cement sheath and enter the earth formations in the vicinity of the borehole and are moderated to thermal energy and captured by the nuclei of the elements in and about the borehole;
   (b) a high density scintillation detector comprising a high density scintillation crystal optically coupled to a photomultiplier tube for detecting gamma radiation induced by said neutrons and which produces output electrical pulses having a magnitude representative of the energy of a gamma ray impinging on said high density scintillator;
   (c) timing means for generating time gates to time separate output electrical pulses corresponding to fast neutron induced gamma rays, thermal neutron capture gamma rays and background gamma rays;
   (d) pulse height analyzer means connected to the output of said scintillation detector for separating the gamma ray energy spectrum of said impinging gamma rays into energy components and for making counts of said energy components as a function of energy;
   (e) gain sensing means to monitor the gain of said scintillation detector comprising two adjacent energy ranges encompassing the iron edge of said thermal neutron capture gamma ray spectrum, with said energy ranges being chosen to minimize effects of varying concentrations of other elements in the borehole environs; and
   (f) gain control means utilizing the output of the gain sensing means to adjust the gain of the scintillation detector to stabilize the gain of said thermal neutron induced, fast neutron induced and background spectra.

2. The system of claim 1 wherein gamma ray energy spectra of inelastic scattering induced gamma radiation is measured during said pulses of fast neutrons.

3. The system of claim 2 wherein said inelastic gamma ray spectra are divided into at least four energy components representative of inelastic gamma radiation produced by carbon, oxygen, silicon and calcium.

4. The system of claim 3 wherein thermal neutron capture gamma ray spectra of gamma radiation induced by the capture of thermalized fast neutrons are detected during the quiescent interval between said neutron pulses.

5. The system of claim 4 wherein said thermal neutron capture gamma ray spectra are divided into energy components representative of capture gamma rays from hydrogen, silicon, calcium, chlorine, potassium, sulfur, titanium and iron.

6. The system of claim 5 wherein said gain control means comprises a microprocessor programmed to control the gain of said photomultiplier based on a ratio of count rates in two energy windows straddling the 7.65 MeV iron (Fe) peak.

7. The system of claim 6 wherein said microprocessor is programmed to maintain said count rate ratio in said two energy windows straddling the 7.65 MeV iron peak as a predetermined constant.

8. The system of claim 1 and further including:
   (g) means for generating time gates during the quiescent period between neutron bursts in a sequence of at least four such gates, to generate a sequence of count rates representative of the die away of the population of thermal neutrons produced by said fast neutron pulses.

9. The system of claim 8 and further including:

(h) means for generating time gates during the quiescent period between neutron bursts, and separate from said sequence of at least four such gates, to generate a count rate representative of the background gamma ray count rate in the well borehole.

10. The system of claim 9, further comprising means for correcting selected count rates in said time gates in response to said generated count rate representative of background gamma ray count rate in the well borehole.

11. The system of claim 1 wherein said scintillation detector comprises a bismuth germanate detector.

* * * * *